US008001259B2

(12) United States Patent
Dettinger et al.

(10) Patent No.: US 8,001,259 B2
(45) Date of Patent: Aug. 16, 2011

(54) PERVASIVE, DISTRIBUTED PROVISION OF SERVICES SUCH AS PRODUCT BROKERAGE

(75) Inventors: Richard Dean Dettinger, Rochester, MN (US); Frederick Allyn Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 3178 days.

(21) Appl. No.: 09/871,929

(22) Filed: Jun. 1, 2001

(65) Prior Publication Data
US 2003/0187916 A1  Oct. 2, 2003

(51) Int. Cl.
*G06F 15/16* (2006.01)
(52) U.S. Cl. ........................................................ 709/231
(58) Field of Classification Search .................. 370/389, 370/355; 709/231, 232, 318, 316, 219; 785/14
See application file for complete search history.

(56) References Cited

U.S. PATENT DOCUMENTS

| | | | |
|---|---|---|---|
| 5,673,322 A | 9/1997 | Pepe et al. | 380/49 |
| 5,727,159 A | 3/1998 | Kikinis | 395/200.76 |
| 5,758,088 A | 5/1998 | Bezaire et al. | 395/200.62 |
| 6,076,109 A | 6/2000 | Kikinis | 709/228 |
| 6,161,140 A | 12/2000 | Moriya | 709/228 |
| 6,691,176 B1 * | 2/2004 | Narin et al. | 719/318 |
| 2001/0015975 A1 * | 8/2001 | Kikuchi | 370/389 |
| 2002/0152122 A1 * | 10/2002 | Chino et al. | 705/14 |
| 2004/0088384 A1 * | 5/2004 | Taylor et al. | 709/219 |

* cited by examiner

*Primary Examiner* — Tonia L Dollinger
*Assistant Examiner* — Adnan Mirza
(74) *Attorney, Agent, or Firm* — Wood, Herron & Evans, LLP (57) ABSTRACT

A client-server computing system suited particularly for homogenous clients of varying functional capabilities. Information handling capabilities are provided at the client and server on a customized, as-needed basis. When a service is needed by a client, the server determines a number of factors that may be relevant to the manner in which the service is to be provided. Then, the server selects from between two or more services having different executable code, and uploads the selected service to the client. Thus, the code may be tailored to the client's capabilities, or other aspects of its function. Services are not permanently retained by a client; rather, the client performs an analysis to determine whether services should be retained or purged. Also, state information is not permanently retained by a client; the server retains the information and uploads that information to the client. The server also manages its resources by loading service components on an as-needed basis.

14 Claims, 6 Drawing Sheets

PERVASIVE, DISTRIBUTED PROVISION OF SERVICES SUCH AS PRODUCT BROKERAGE

FIELD OF THE INVENTION

The present invention relates to client server computing systems in which services provided by the client and server are dynamically loaded to the client from the server.

BACKGROUND OF THE INVENTION

With the proliferation of the Internet and applications utilizing Internet or other networking systems, increasingly, data has been accessed from servers using diverse platforms in varied locations and circumstances. Currently, a variety of Internet clients are available for accessing Internet information, including embedded devices (e.g. browsers in household appliances), palm size personal computers, palm size organizers, desktop personal computers, lap top computers, cellular telephones and other platforms that are being developed presently. The diversity of platforms available for accessing Internet content is expected to expand, particularly as wireless data networks become increasingly available to users.

Each of the variety of clients currently available has unique memory performance and functionality constraints. The unique physical characteristics of each client, or the desired functional use of the client, implies that each client will have different processing code and different input/output functionalities available to it.

This diversity of platforms raises a number of difficulties. First, most Internet content, and content on other networks such as corporate intranets, has been developed to facilitate communication with a single type of client, namely, a desktop or notebook computer having a standard size display screen, a full alpha/numeric keyboard, and frequently also a pointing device. Content developed for this client platform is not well suited for use in and viewing on other dramatically different platforms, such as embedded devices, palm size personal computers, organizers and cellular telephones. To date, the content that is easily available through such non-standard platforms has been limited to that made available in conjunction with the manufacturer of the client hardware.

Second, diverse platforms require different software capabilities to handle content delivered over a network; these capabilities are difficult to predict in advance or to install in advance of their desired use. Although it has been known to install functions for Internet content on an as needed basis, the methodologies that have been developed are not particularly suitable for diverse clients with varied and potentially highly limited capabilities and resources.

For example, Microsoft Internet Explorer includes an install on demand feature in which Internet Explorer will recognize when given functionality is needed to properly present web page content, and in this condition will prompt the user to download and install the needed functionality. The difficulty with this approach is that the installed functionality is permanently installed at the client computer, and thus may consume precious resources, particularly where the client has limited resources such as is the case in palmtop or cellular telephone clients.

As a second example, the Java Virtual Machine functionality has been promulgated by Sun Microsystems as an open source programming language for use with web-based content. In a Java-enabled website, Java Virtual Machine (VM) code for a page is downloaded and initiated as part of viewing the page. The Java Virtual Machine code is retained in memory and executed, so long as the page is viewed by the user. When the user departs the page the Java Virtual Machine code is discarded. A difficulty with the Java methodology is that the Java Virtual Machine code for a given web page is identical for all clients visiting the page, and thus is not adaptable for clients with radically different functionalities and capabilities. Furthermore, the Java Virtual Machine code for a web page is downloaded in full upon accessing the page, potentially requiring resources in excess of those available in a client with limited computing or storage capabilities. Finally, because Java Virtual Machine code is discarded upon exiting the page associated with the code, the user upon returning to that page must reinitialize his or her browsing state, such as information retrieved or data entered, because that state information is not retained when the Java Virtual Machine code is discarded.

A third difficulty arising from the use of diverse clients with potentially widely varying capabilities, arises when attempting to retain information on the state of interaction of the client with a server. Web browsers such a Microsoft Internet Explorer have incorporated a functionality known as "cookies". In this methodology, a server may store a small file known as a "cookie", on a client computer, that contains some status information. "Cookie" files are stored and retrieved by the server, under supervision of the client's browser software. In some cases, cookies may be used to restore the state of a user upon return to a web page. However, cookies may consume an inordinate amount of a client's storage resources. Furthermore, due to security concerns, many users dislike the "cookie" approach of storing information on a client's computer system. For either or both reasons, many users prevent storage of cookies on their client systems.

A further, related, difficulty arises in a server attempting to provide services to a wide variety of clients. Specifically, in a typical server, all data and executable code needed to provide services to clients that may connect to the server, are loaded in the server at all times. This approach, while insuring that all possible services are always available from a server, can consume substantial resources of a server. This is particularly true where multiple different styles of clients and/or multiple different services may be utilized from the server. As unique executable code or data is developed for different unique clients, the duplication and proliferation of different server functions will be exacerbated.

The UNIX daemon known as INETD, attempts to resolve this problem by defining a static list of services that may be provided by a server. This list is used to load needed services when those services are demanded by the server. Unfortunately, the UNIX INETD daemon suffers from the limitation that the services provided by the server must be predefined and be in a static listing, limiting the adaptability of the server to changing conditions.

It can thus be seen that the state of the art has substantial limitations in managing, on both the client and server, the emerging environment characterized by diverse clients connecting to servers for providing services over a network.

In the preceding discussion, and in the following explanation, of the invention, the word "service" will be used to refer to executable code or an executable process, or data utilized in such a process, or both, in any combination, that provides an information handling function. Furthermore, a "service" will be understood to comprise client and server components, which interact to provide an information handling function, each component of which may include executable code, data, or both, in any combination. The client and server portions of the service interact and interoperate to provide the desired overall information handling functionality of the service.

SUMMARY OF THE INVENTION

In accordance with a first aspect of the present invention, the above-noted drawbacks of prior client-server computing systems are ameliorated by providing information handling capabilities that are part of a service to a client computer system on an as-needed basis. Specifically, when a service is desired by a client that is not currently available to the client, the client requests the service from a server, and the server in response determines a number of factors that may be relevant to the manner in which the service is to be provided. These factors may include such facts as the operating system of the client and server, the connection speed and cost, the current time of day, and the geographic locations of the client and server, among others. In response to the collected factors, the server selects from between two or more services having different executable code, and uploads the selected service to the client. Thus, for example, a palmtop or desktop/laptop client having a relatively small or less colorful display may receive virtual machine code particularly suited for its small size or limited color capabilities, whereas a desktop computer with a large screen and large color pallette may receive virtual machine code taking advantage of these features.

In accordance with a second aspect of the present invention, the limited resources of a client computer system are preserved by eliminating unneeded previously loaded services. Specifically, the client performs an analysis of the usage of services to determine whether those services should be retained or purged. Those that ought to be purged, e.g., those not being used or which have not been used recently, are removed from storage in the client, saving storage space. The period of disuse of a service, and/or the presence of a connection to a server relating to the service, or other factors may be used in determining whether a service ought to be purged.

In accordance with a third aspect of the present invention, the use of a service by a client is facilitated by retaining state information at the server, for delivery to the client. In this way, the client has the advantage of maintaining a state of interaction with a server, without the disadvantage of consuming storage space for state information such as "cookies". In accordance with this aspect, when a client connects to a server, state information relating to prior interactions of the client and server is uploaded to the client along with executable code of a service, so that it may be used by the client in subsequent execution of the code and provision of the service. In this way, a client may efficiently use a server by, for example, returning to a database query generated during the immediately previous session with the server. This aspect of the invention is particularly useful for homogeneous clients operating on battery power and expensive wireless connections, and thus frequently connecting and disconnecting from a server.

In a fourth aspect, the invention features a server configured to facilitate support for a wide variety of services, in which the server loads services on an as-needed basis. Specifically, in accordance with this aspect, a server responds to a request for a service from a client by selecting an appropriate one of multiple possible services, and then loading the selected service and executing the service. Because services are selected at the time of a clients' request for service, and are not uniquely associated with each client, the server has the advantage of reduced overhead at all times that a given service component is not in use, while retaining flexibility to respond to various different situations using different clients.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
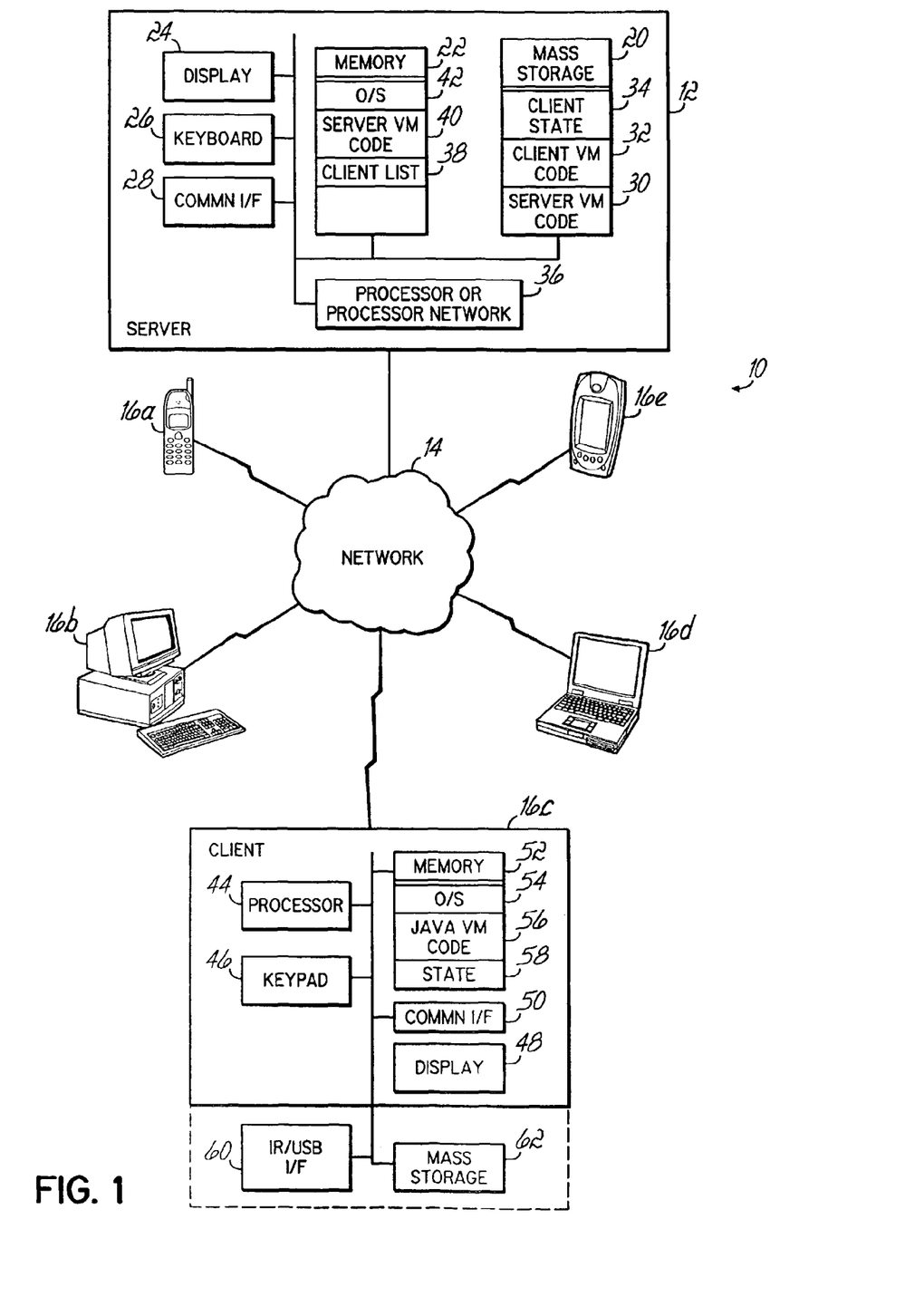
FIG. 1 is an illustration of a networked computer system including a server and clients of a variety types including cellular telephones, palm devices, laptop and desktop computers, and other various clients.

Referring now to FIG. 1, a network computing environment 10 consistent with principles of the present invention can be explored. A server 12 is connected to a network such as the Internet 14 for communication with each of a plurality of heterogenous client devices 16a through 16e. These clients may include, for example, a cellular telephone client 16a, a desktop personal computer client 16b, a laptop computer client 16d and a palmtop computer or other palm device 16e.

The essential functional elements of a server 12 are illustrated in FIG. 10, including the information that is utilized thereby. Specifically, server 12 includes a mass storage device 20 such as a direct access storage device or DASD, as well as a memory 22 such as DRAM memory for temporary storage of information during operation of server 12. Server 12 further includes a display 24 and keyboard 26 used in interacting with server 12. Server 12 may further include one or more communications interfaces 28 for connecting to network 14 and/or other computer systems or peripheral devices.

Within mass storage device 20 are a number of data structures used in accordance with the principles of the present invention. Specifically, mass storage device 20 stores server virtual machine code in an area 30, which code may be loaded into memory 22 on an as-needed basis in accordance with the principles of the present invention. Also, mass storage 20 may include client virtual machine code 32 which may be uploaded to clients in accordance with the principles of the present invention, on an as-needed basis. Also, as described below, state information relating to the state of interaction of clients with server 12 is stored in an area 34 on mass storage device 20.

The foregoing areas of mass storage device 20 are accessed by a processor or processor network 36 in operation of server 12 in accordance with the principles of the present invention. Processor or processor network 36 utilizes memory 22 for storage of active client information as well as server virtual machine code for services currently being provided by server 12. Specifically, memory 22 stores a client list 38 identifying clients currently accessing server 12, or alternatively a count of a number of clients accessing each service of server 12. This information is utilized in management of services that are loaded within server 12 at any given time. Memory 22 further stores, in an area 40, virtual machine code utilized by server 12 in providing the services to the connected clients. Server 12 further stores, in an area 42, operating system code defining an operating system for server 12.

As seen in FIG. 1, the client may take a variety of forms 16a-16e, but the functional elements of a client typically take the general form shown with reference to client 16c. As seen in FIG. 1, the typical client includes a processor 44 for processing data, and a keypad 46 and display 48 for interacting with a user of the client device. The form of processor 44, keypad 46 and display 48 may vary widely depending upon the nature of the client device. However, a typical client device will include at least these elements for interacting with a user. Typically, a client will further include a communications interface 50 for exchanging data with a server such as server 12 over a network such as network 14. Also, a typical client will include a memory 52 for storing data and program code used by the processor 44 in performing functions of the client. As seen in FIG. 1, the memory 52 will typically include an operating system and a portion 54 defining general operations of the client, as well as additional information used by the operating system. In accordance with the principles of the present invention, this additional information may include Java Virtual Machine (VM) code stored in a region 56 of memory 52, and state information stored in a region 58. The Java VM code comprises programming instructions in accordance with the Sun Microsystems Java programming language, used in providing a service as is known in the art. The state information in region 58 of memory 52 relates to a current state of operation of the client device utilizing the Java Virtual Machine code.

Client devices of various forms may also have additional functionality, as shown within dotted lines in FIG. 1. Specifically, a client may have an external interface such as an infrared (IR) or universal serial bus (USB) interface for exchanging data between the client device and other computer systems. The client device may also include a mass storage system 62 for storing larger quantity of data that can be held within memory 52.

Figure 2:
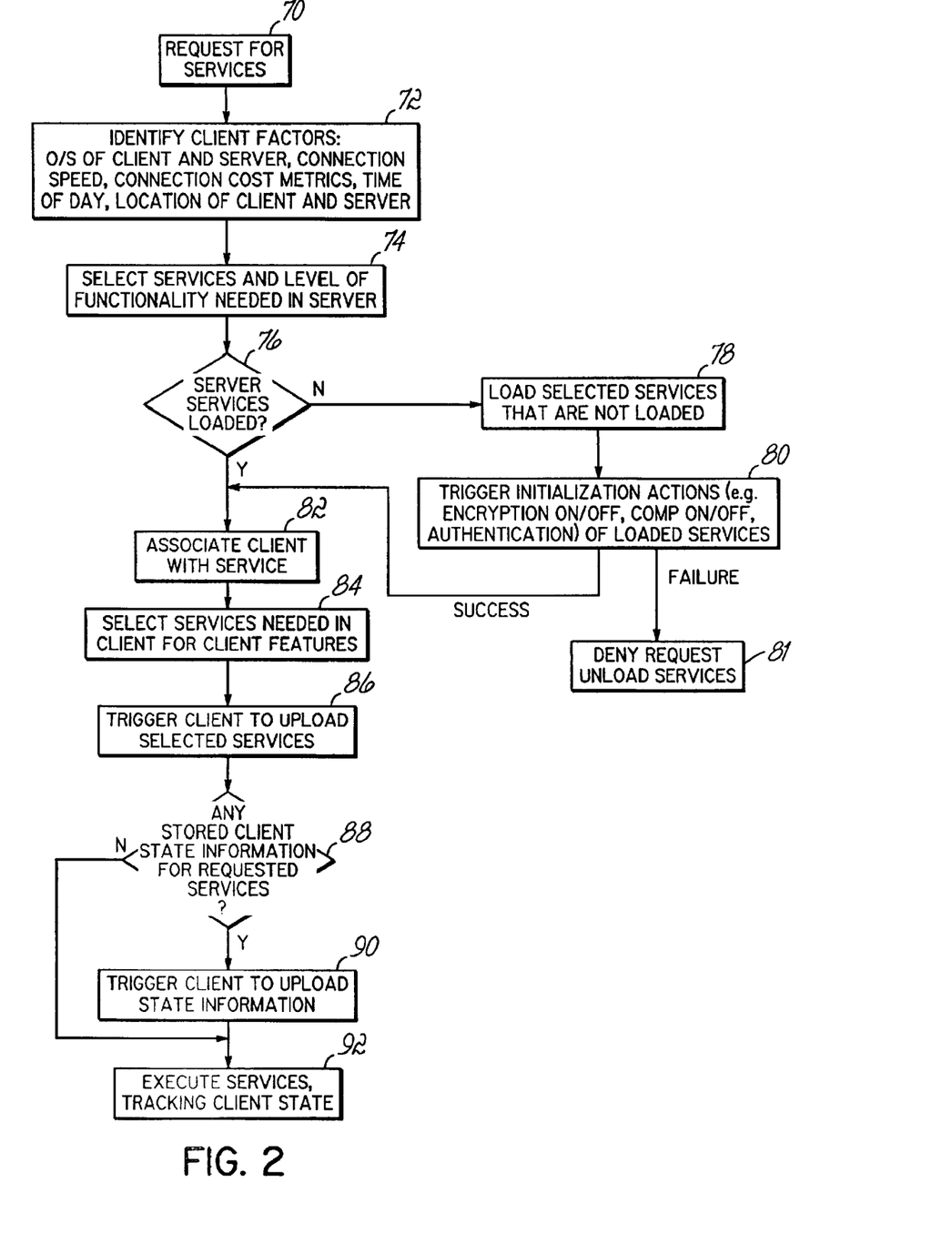
FIG. 2 illustrates the activity of a server such as that shown in FIG. 1 in accordance with the principles of the present invention in responding to a request for services from a client.

Referring now to FIG. 2, operations performed by a server such as server 12 in a carrying out principles of the present invention can be explained. The server responds to a request to participate in providing services in step 70. Initially, the server identifies factors relating to the manner in which the client should provide those services, in step 72. The factors that may be considered in identifying the appropriate manner in which to provide services include the operating system of the client or the server, the connection speed of the network connection between the client and the server, and metrics relating to the cost of the connection between the client and the server, such as the cost per data unit transferred or cost per connection time unit. Further factors that may be invoked are the time of day in which the request for services is made, such as in a situation where a service may be provided only during business hours of the sponsoring organization or may be provided in a different manner outside of normal business hours of the sponsoring organization (e.g., orders may be received but not confirmed outside of business hours). Finally, the provided services may be selected or modified based upon the physical location of the client and or the server, so that, for example, services may be provided in a manner that is responsive to the geographic location of a client.

Following identifying client factors in step 72, in step 74 these factors are used to select the services and the level of functionality of those services that need to be supported by the server to provide the identified service to the client. A noted above, different clients may be provided with services in different manners. A client with a small or limited functionality display may be provided the service using a simplified screen display. A client with a limited communications speed may be provided the service so that the data transfer is minimized, e.g., data such as a list of records being browsed by the user may be provided as the browsing is performed, rather than in advance of the browsing. In each case, the component of those services provided by the server may be different.

Thereafter, in step 76, it is determined whether the server has already loaded the necessary service components needed to provide the selected service and level of functionality. It will be noted that the server may already be providing similar services to another client, and thus may have already loaded the necessary services components. If, however, the necessary server components have not been loaded, then in step 78 the selected services that are not loaded are loaded into the server.

It will be noted that some services need to be provided in a particular context or under particular controlled situations. For example, some services may be provided only when encryption of data is being used. Similarly, services may be provided only when compression is being used. Finally, some services may only be provided when authentication of those services is available. In any of these situations, it is necessary to trigger initialization to establish the appropriate conditions such that services are provided in the proper context. Thus, in step 80, any initialization actions such as starting encryption or compression, or requesting authentication, are triggered. Thus, any such initialization actions that must be performed, are preformed at the time the service system is installed.

It will be noted that initialization actions may not be successfully performed. For example, the client may fail authentication or may not be capable of encryption. In this case, from step 80, processing continues to step 81, in which the request for service is denied, any services loaded in step 78 are unloaded.

After step 80, or immediately after step 76, if all server components of the desired services have been loaded, in step 82 the client requesting those services is associated with the services being used by that client. This step is performed so that it may be determined when a service is no longer being used by any clients and thus may be discarded by the server. The information retained with respect to client use of services may identify specific clients associated with specific services, or may take the form of a counter to identify the number of clients associated with each service. In either case, sufficient information will be available to discard server components of services that are no longer being used by any clients.

After the foregoing initialization of the server, in step 84 the server identifies the service components that need to be uploaded to the client. Thereafter, in step 86, the client is triggered to upload the selected services. After the services have been uploaded by the client, in step 88 it is determined whether any stored client state information is available for any of the requested services. If so, then in step 90 the client is again triggered to upload this state information so that the client may recommence use of the selected services with a state that corresponds to the most recent state of that client using those services.

After step 90, or after step 88, if no state information is stored, the client and server proceed to execute the selected services. During execution of the services, the server tracks the state of the client, i.e., tracks data entries made, data retrievals requested or other state information that can be used to restore the state of the client upon a subsequent request for the same service.

The execution of the services and concurrent tracking of client state is represented by step 92 in FIG. 2. This process continues until the client disconnects from the server.

Figure 3:
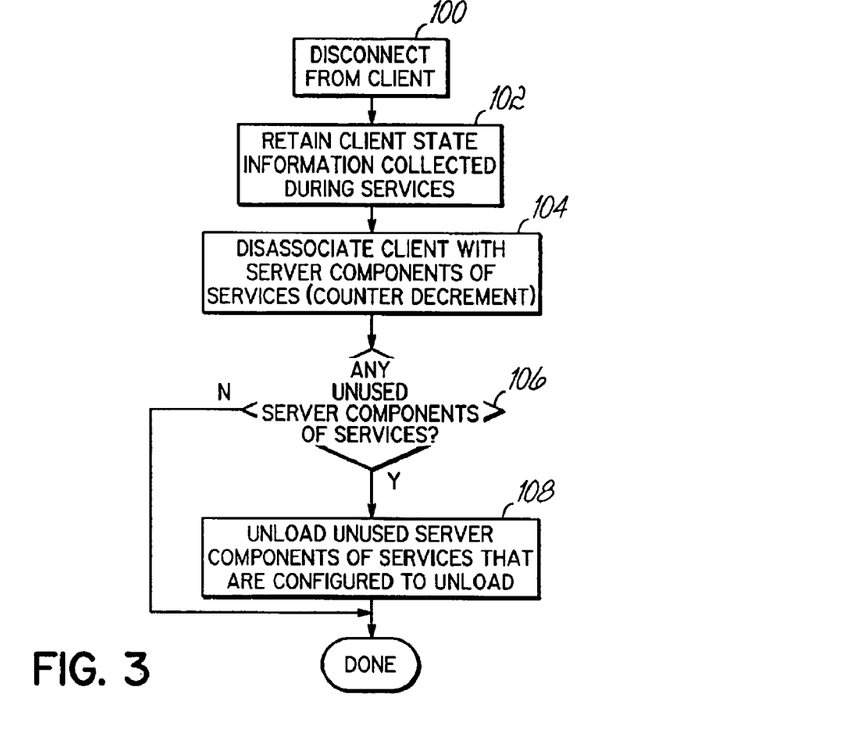
FIG. 3 illustrates the activities of the server such as that shown in FIG. 1 in accordance with the principles of the present invention in responding to disconnection of a client from the server.

Referring to FIG. 3, when a client disconnects from the server, and thus discontinues use the services, as signified by step 100, then the server evaluates its use of server components of the services formerly provided to the client. In a first step 102, the client state information collected during the client's use of the service is closed and stored for later use if the client reactivates the service. In a further step 104, the client is disassociated with the server component of the service that has been provided. As noted above, this may involve moving the client from a list of clients associated with those service or may involve decrementing a counter of the number of client utilizing a service. Thereafter, in step 106, it is determined whether any clients are continuing to use the server components of the service that has been terminated. If not, then in step 108 the unused server components of the service that are configured to be unloaded are unloaded from the server. It will be appreciated that some server components of services may be configured to remain resident in a server even in the instance that no clients are using those services. This may be done to increase the speed of availability of services or for other reasons. Those server components of services that are configured to be unloaded in non-use, however, are unloaded in step 108 after completing use of those components.

Figure 4:
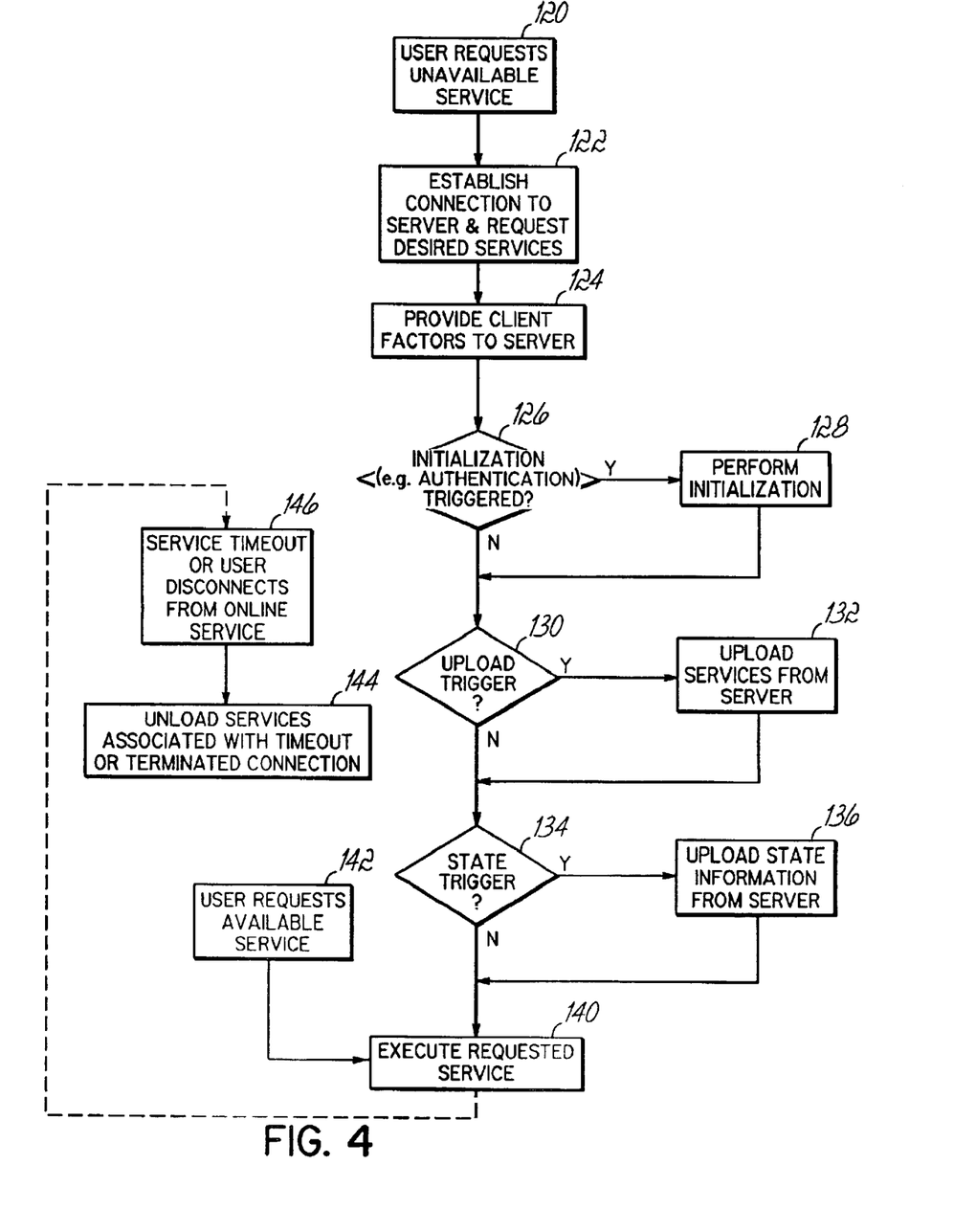
FIG. 4 is a flow chart illustrating activities of a client in accordance with the principles of the present invention.

Referring now to FIG. 4, the activity of a client in performing services can he explained. In a first possible scenario, a user may request a service that is not available within the client, such as by accessing an Internet location (either directly or under the control of an application or applications programming interface), or accessing a link to an Internet uniform resource locator (URL). In response to this action in step 122, a connection is established to the server and the desired services are requested.

Then, in response to activity in the server discussed above, in step 124 the client provides to the server factors relating to the client to be used in identifying the services and functionality of those services to be provided to the client. Next, in step 126, the client may be triggered for various initialization actions as discussed above, such as authentication. If such an action is triggered, then in step 128 the appropriate initialization is performed.

Thereafter, in step 130 the client may be triggered to upload client components of one or more services. If so, in step 132 those services are uploaded from the server. Thereafter, in step 134, the client may be triggered to upload state information, in which case in step 136 the state information is uploaded from the server.

After the following steps, the client has been provided with necessary client components to perform the requested services in accordance with the client factors provided to the server. As a consequence, in step 140, the requested service is executed.

It will be noted that, in some instances, a user may request a service that has already been loaded in a client. For example, may not have been purged from the client after the most recent use of the service if the client is configured to retain services after their use has ended. As another example, a user may wish to have two active windows accessing services, to facilitate comparison or manipulation of data relating to the services. In this case, when a second window to the service is opened, the client's component of the service may already be loaded in the client. In such a circumstance, represented by step 142, the client may proceed directly to step 140, and execute the requested services without requiring uploads or initialization.

The execution of the requested service, represented by step 140, is continuous until the user disconnects from the service or the service remains unused for longer than a time-out period. As noted above, some services may be retained even if unused so as to avoid reloading. In the case of either a time-out of a service, or a disconnection of the user from the service in step 144, if the service is to be purged, then in step 146 all services associated with the time-out or terminated connection are unloaded from the client. This frees resources of the client for other services.

In use, the principles of the present invention may be utilized to substantially facilitate use of diverse heterogeneous clients in a wide variety of applications. One such specific application is illustrated in FIG. 5 through FIG. 8. In this application, brokerage of items of value such as homes or automobiles is provided utilizing service components in a client and server in accordance with the principles of the present invention.

Figure 5:
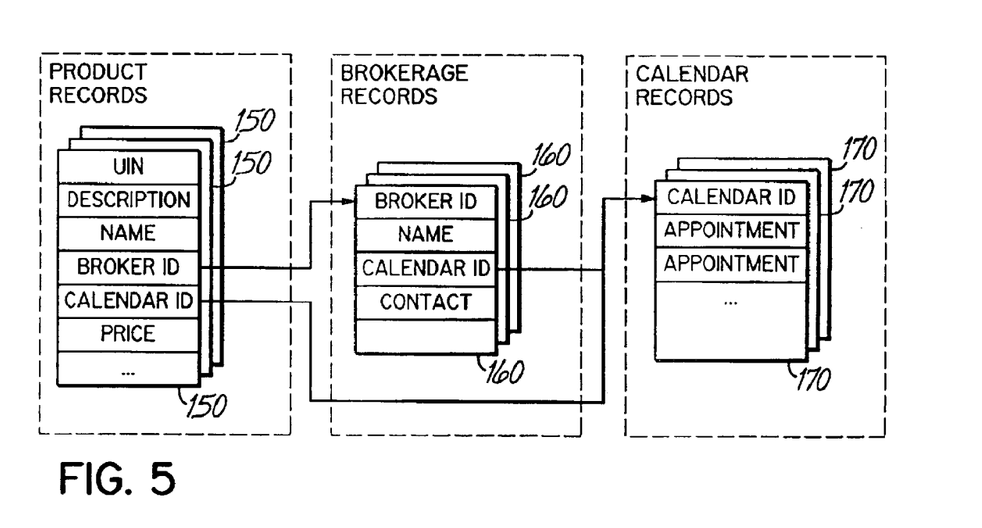
FIG. 5 is an illustration of data structures that may be used in accordance with one implementation of the principles of present invention for providing services for brokerage of real estate, automobiles, or other items of value.

FIG. 5 illustrates records for storing information utilized in a brokerage application of this kind. Specifically, a plurality of product records 150 store information about the products that are subject to the brokerage service. For example, products may be homes offered for sale through a multiple listing service, or automobiles offered for sale, or any other items available for sale. Each product is associated with an unique identifying number or UIN that distinguishes the product from other products. Each product record 150 includes the UIN as well a description and name for the product, and an identifier for a broker responsible for brokerage of the product. The records further include an identifier for a calendar of availability of a product such as a dates on which a home may be viewed by a prospective home buyer or dates when an automobile may be test driven by a prospective buyer. Product records 150 are also illustrated to include a price that may be displayed when browsing through records. A variety of other information about products may be included in the product records 150 as appropriate for a particular application.

As noted above, products are linked to brokers. This link is formed using a broker identifier. A plurality of brokerage records 160 identify each of a plurality of brokers of the products described in the product records 150. Each broker is identified by a broker identifier, by name, and by contact information. Furthermore, the calendar for the broker such as the availability or the broker to show products to a possible buyer, is identified by a calendar associated with a calendar identifier.

As noted, products and brokers are linked to their calendars. This is done using a calendar identifier which can be used to identify one of number of calendar records 170. Calendar records 170 store information about a calendar, such as a calendar of availability, or a calendar of unavailability of a product or broker. Each calendar record is shown in FIG. 5, and contains a calendar identifier linking the calendar to a broker or product, as well as a number of appointment entries each relating to an appointment on the calendar.

Figure 6:
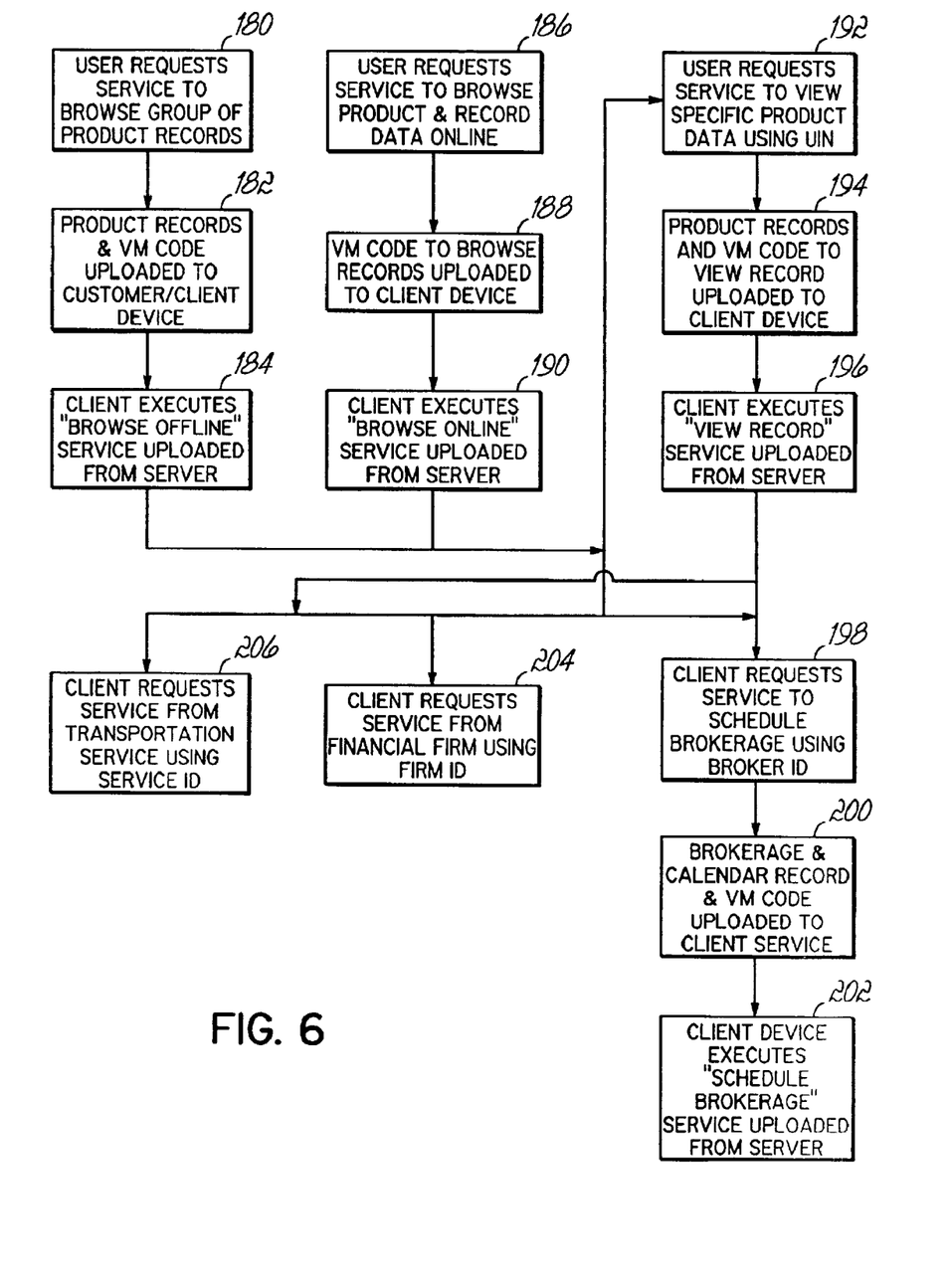
FIG. 6 is a flowchart of various services that may be activated in accordance with the implementation of a brokerage service.

Referring now to FIG. 6, the use of data structures of FIG. 5 in the implementation of brokerage-related services can be explained. As noted above, a user may initiate one of a variety of services, in a variety of ways, and in accordance with the principles of the present invention these services are loaded as needed, and unloaded when no longer needed. In the case of a brokerage server, a user may begin use of the server by, in step 180, requesting a "browse offline" service to browse a group of product records. In response, in step 182, product records may be uploaded to the customer's client device, as part of a service including that data as well as virtual machine code for browsing that data. Thereafter, in step 184 the client may execute the code to execute the virtual machine code that has been uploaded from the server to view the product records uploaded from the server as provided by the "browse offline" service.

Another manner in which a user may begin use of a brokerage service is illustrated in step 186, in which an user requests a "browse online" service to browse product and record data online. In response to this request, in step 188 virtual machine code to browse records is uploaded to the client device. Thereafter in step 190, the client executes an online browsing routine that has been uploaded from the service.

It will be noted that the decision whether to browse product data offline or online may be made by the user, or alternatively, may be made as part of evaluating factors relating to the client to determine the manner in which a generic "browse" service is to be provided to that client. In the latter, case, the user would request a "browse" service and in response, based upon an evaluation of factors including the connection speed of the client and its storage capacity, a decision would be made by the server whether to perform an offline or online browse, after which the interaction with the client would proceed as shown in steps 180-184 (for an offline browse) or as shown in steps 186-190 for an online browse).

In either of the above scenarios, the client may browse through product records presented in a summary fashion to identify a product record of interest. When a product record of interest is identified, typically a universal identification number (UIN) is obtained from the record being browsed, and used to select additional data regarding the product that has been identified. This may be done manually, or preferably the UIN may be automatically used in requesting a new service when a record including that UIN is designated by the user by, e.g., double clicking upon the record.

It is also possible that a user may directly identify a universal identification number for a desired product, such as if that number is advertised on a "for sale" sign associated with a house, or is included in an advertisement for a automobile for sale, or in other circumstances where an UIN may be directly identified to a customer.

In any of these scenarios, as symbolized by step 192, a user may request a service for viewing a specific product's data, identifying that product by its UIN. In response, in step 194, the product record and virtual machine code to view that record are uploaded to the client device, as the client component of a new "view record" service. Then, in step 196, the client executes the view record virtual machine code to provide a user with the complete record of the product, as uploaded from the server.

It will be noted that a client may request other services in the process of using a brokerage service in accordance with the principles of the present invention. For example, in step 198 the user may request a service to schedule brokerage for an identified product. In this case, in step 198 the client requests a "schedule brokerage" service that will be used to schedule brokerage for a broker associated with a selected product. In response in step 200, brokerage and calendar records and virtual machine code are uploaded to the client device. Next, in step 202 the client device executes the brokerage scheduling service uploaded from the server to permit the user to schedule brokerage with the broker for the product of interest.

The client may also access other services in a similar manner. For example, in step 204, a client may request a service provided by a financial firm, based upon advertisement for the firm included in a product record, using a URL for the financial firm identifier, or using another link to a desired product's record. The financial service then uploaded to the client may be used to request financing for purchasing the product, or an advance of credit for purchasing the product, in accordance with a revolving credit account.

Alternatively, in step 206 the client may contact another form of organization, such as a transportation organization (air line, taxi service, etc.), using a URL or a link to a product, or other identifier. The client may request transportation services to visit the broker or product and/or to transport the product, as part of purchasing the product.

Figure 7A:
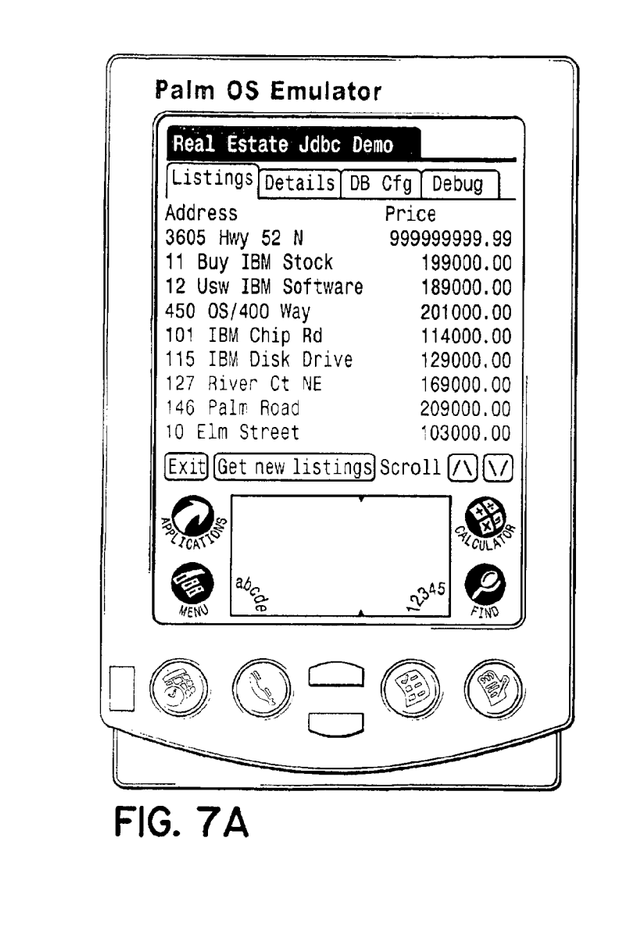
FIGS. 7A and 7B illustrate a brokerage service being performed on a palm operating system client, including display of listings and details of a particular listing.
Figure 7B:
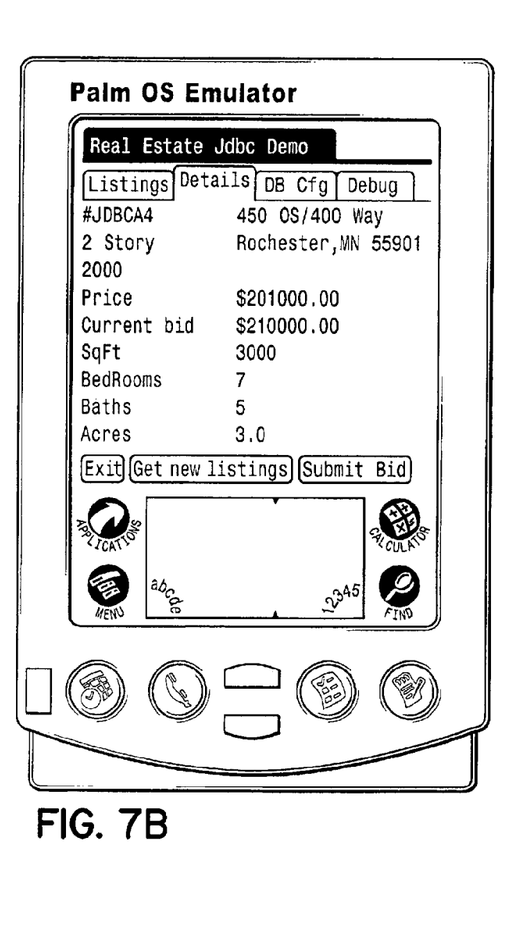

FIGS. 7A and 7B are illustrative examples of operation of a Java Virtual Machine displaying real estate brokerage information in accordance with this example of the present invention. In FIG. 7A, it can be seen that summary information for a number of product records, including the address and price associated with each record, are listed in connection with a browsing service such as an offline browsing service or an online browsing service. FIG. 7B illustrates alto alternative service in which details about a particular product record are displayed in accordance with a view record service as described in steps 192 through 196. It will be noted that, although the browsing and product information services are distinct services, their screen appearance is compatible and thus both services appear to be seamlessly connected parts of a single application.

Figure 8:
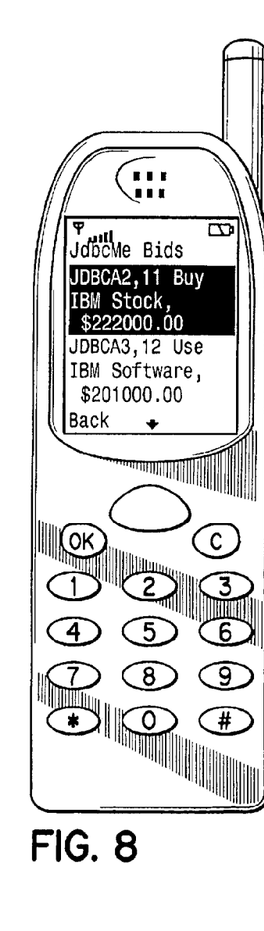
FIG. 8 illustrates operation of a brokerage service on a cellular telephone client, showing selection of items suitable for bidding.

Referring to FIG. 8, it can be seen that in different varieties of client devices, services may result in substantially different functions or operations. For example, on a cellular telephone as illustrated in FIG. 8, browsing of product record information is performed on the cellular telephone screen using a format that is adapted for a cellular telephone, rather than a format adapted for a palm device as is shown in FIGS. 7A and 7B.

Thus, it will be appreciated from the foregoing that the present invention provides improved method for providing services over a computing network to a plurality of diverse heterogeneous clients and for providing those services in a manner that efficiently uses resources of the server and the clients while adapting to the increasingly wide variety of client platforms through which such services can be provided.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, while the present invention has been described in the context of client and server computer systems, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g. a floppy disk) and CD ROMS, and transmission type media such as digital and analog communication links, including wireless communication links. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of providing an information handling capability to a client computer system in a networked computer system comprising client and server computer systems, comprising the following steps executed at a client computer system:
   storing executable code for providing said information handling capability,
   the client performing an analysis of usage of said information handling capability by said client computer system to determine whether said executable code ought to be retained in storage by said client computer system, and
   in response to a determination that said executable code ought not be retained by said client computer system, unloading said executable code from storage in said client computer system.

2. The method of claim 1 wherein said analysis comprises determining a period of disuse of said information handling capability by said client computer system.

3. The method of claim 1 wherein said analysis comprises determining the presence of a connection between said client computer system and a server computer system involved in provision of said information handling capability.

4. The method of claim 1 wherein said information handling capability comprises providing brokerage information to a user of said client computer system.

5. The method of claim 4 wherein said brokerage information comprises product information and pricing.

6. The method of claim 5 wherein said product is real estate property.

7. The method of claim 5 wherein said product is chattel property.

8. The method of claim 7 wherein said product is an automobile.

9. The method of claim 1 wherein said information handling capability comprises providing scheduling information to a user of said client computer system.

10. The method of claim 1 wherein said information handling capability comprises providing financial information to a user of said client computer system.

11. The method of claim 1 wherein said information handling capability comprises providing transportation service information to a user of said client computer system.

12. A client computer system in a networked computer system comprising client and server computer systems, comprising:
   a processor,
   storage for executable code, and
   a communications interface for connecting to a server computer system,
   said processor executing said executable code to provide an information handling capability in conjunction with a server computer system, and further performing an analysis of usage of said information handling capability by said client computer system to determine whether said executable code ought to be retained in storage by said client computer system, and, in response to a determination that said executable code ought not be retained by said client computer system, unloading said executable code from storage in said client computer system.

13. The client computer system of claim 12 wherein said analysis comprises determining a period of disuse of said information handling capability by said client computer system.

14. The client computer system of claim 12 wherein said analysis comprises determining the presence of a connection between said client computer system and a server computer system involved in provision of said information handling capability.

* * * * *